(No Model.)
J. M. CARPENTER.
TAP AND DIE HOLDER.
No. 560,083. Patented May 12, 1896.
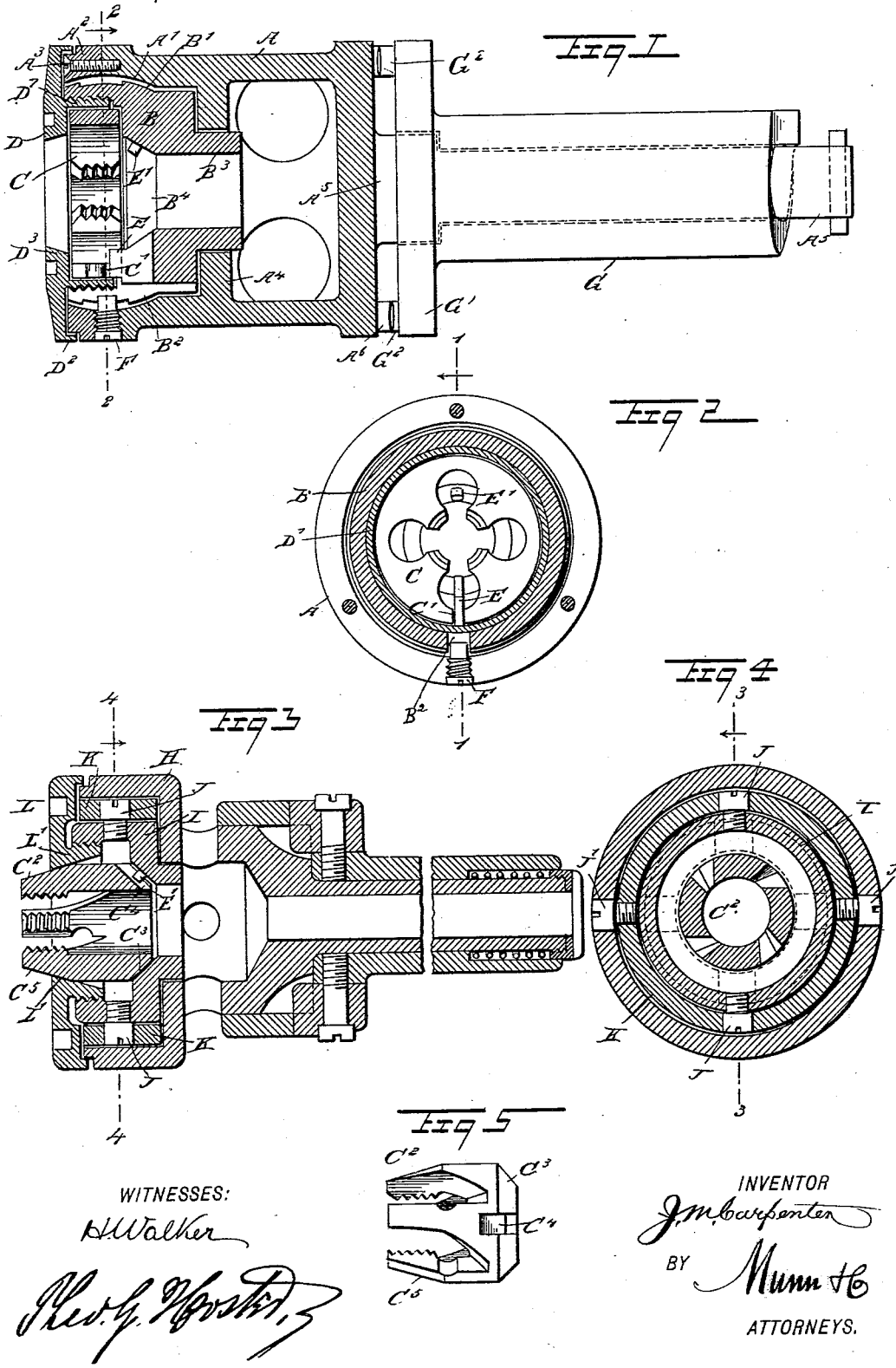
WITNESSES:
H. Walker
Geo. G. Hoster
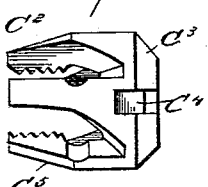
INVENTOR
J. M. Carpenter
BY Munn & Co.
ATTORNEYS.

UNITED STATES PATENT OFFICE.

JAMES M. CARPENTER, OF PAWTUCKET, RHODE ISLAND, ASSIGNOR TO THE J. M. CARPENTER TAP AND DIE COMPANY, OF SAME PLACE.

TAP AND DIE HOLDER.

SPECIFICATION forming part of Letters Patent No. 560,083, dated May 12, 1896.

Application filed June 21, 1895. Serial No. 553,602. (No model.)

*To all whom it may concern:*

Be it known that I, JAMES M. CARPENTER, of Pawtucket, in the county of Providence and State of Rhode Island, have invented a new and Improved Tap and Die Holder, of which the following is a full, clear, and exact description.

The invention relates to tap and die holders used in screw-cutting or other machines; and the object of the invention is to provide a new and improved tap and die holder, arranged to permit the tap and die to accommodate or adjust itself relative to the work, to compensate for any defects in the die itself and defects in the alinement of the spindle of the machine with the tap or die holders, so as to insure a perfect cutting of the thread.

The invention consists of certain parts and details and combinations of the same, as will be fully described hereinafter, and then pointed out in the claims.

Reference is to be had to the accompanying drawings, forming a part of this specification, in which similar characters of reference indicate corresponding parts in all the figures.

Figure 1 is a sectional side elevation of the improvement on the line 1 1 of Fig. 2. Fig. 2 is a transverse section of the same on the line 2 2 of Fig. 1. Fig. 3 is a sectional side elevation of a modified form of the improvement on the line 3 3 of Fig. 4. Fig. 4 is a transverse section of the same on the line 4 4 of Fig. 3, and Fig. 5 is a side elevation of one of the dies.

In machines for cutting threads by taps and dies as heretofore constructed it frequently happens that poor threads are cut owing to defects in the alinement of the spindle of the machine and the tap or die holder, or by reason of the sides of the dies and taps not being at right angles with the axis of the work to be threaded. Now in order to overcome the defects mentioned, and to permit of cutting perfect threads by machines, it is necessary to allow the tap and die to freely assume a natural position relative to the work, the same as takes place when the taps and dies are in the ordinary holders operated by hand. In order to accomplish this on screw-cutting or other machines, it is necessary to mount the tap or die in a seat arranged to swing freely in the holder, held in the turret-head of the machine, so that the said seat can oscillate to bring the axis of the threaded part of the die or tap parallel with the axis of the work to be threaded, provided the spindle of the machine is in line with the die-holder, and if the latter is not the case it is necessary to have another motion back of the center of oscillation of the seat of the die to permit the die seat and holder to move in the direction to compensate for the improper alinement.

As shown in Figs. 1 and 2, the head A of the holder is formed in its front end with a ball-shaped recess A', in which fits the correspondingly-shaped exterior surface B' of the seat B, in which is held the die or tap C, of ordinary construction. A cap D, provided with a threaded flange D', screws in the seat B to hold the die C in place, the latter being prevented from turning in its seat by a lug E, forming part of the seat B and extending into a slot C' in the die C. A screw F, screwing in the head A, engages a recess $B^2$, formed in one side of the seat B, to prevent the latter from turning in the head A, but to permit the seat to oscillate in the head A, owing to the ball-joint between the seat and the head.

In order to insert the seat B into the head A, I provide the outer end of the latter with a removable ring $A^2$, forming part of the ball-shaped recess, and secured to the head A by screws $A^3$, as plainly indicated in Fig. 1. The cap D is provided at its outer end with an annular flange $D^2$, extending loosely into an annular recess in the said ring $A^2$, to prevent cuttings from passing into the ball-joint. It is understood that the inner surface of the cap D extends a short distance from the outer face of the ring $A^2$, so that a sufficient oscillating motion of the seat B is possible to permit the seat B, and consequently the die C, to adjust themselves relatively to the work.

The inner or rear end of the seat B is provided with a hub $B^3$, into which the work can pass, and this hub $B^3$ extends loosely through an opening in a flange $A^4$, formed in the head A. The latter is provided on its rear end with a spindle $A^5$, which may be of one diameter its whole length, but which is shown with two diameters, both of which fit loosely in the sleeve G for the purpose of allowing the head A and the die or tap holder contained therein to act in conjunction for the purpose of adjusting themselves to the axis of the work to be threaded.

The sleeve G has a flange G', provided with pins $G^2$, adapted to engage corresponding pins $A^6$ on the rear face of the head A, so as to prevent the latter from turning in the sleeve G, which is held in the turret-head of a screw-cutting machine.

The seat B is adapted to receive a die $C^2$ instead of the ordinary die C, and this die $C^2$ is formed at its inner end with a conical base $C^3$, adapted to fit into a correspondingly-shaped recess $B^4$ in the seat B. This construction will insure an accurate centering of the die in the seat. A notch $C^4$ in the base of the die $C^2$ is engaged by a pin E' in the seat B to prevent the die revolving in the seat. The cap D has the wall of its opening beveled, as at $D^3$, to engage the correspondingly-shaped front bevels $C^5$ of the arms of the die $C^2$, so that when the die is seated in the seat B and the cap D is screwed up then the beveled wall $D^3$, in engaging the beveled outer surface of the die-arms, causes the latter to move into proper position by bending the said arms inward in case they should not be entirely true. By this arrangement any irregularity in the die arms or sides is adjusted by the cap. The first or preliminary centering, however, as above described, is effected by the engagement of the tapered base $C^3$ with the recess $B^4$ of the seat, so that an accurate centering will be obtained whether or not the arms of the die are true. As the cap engages the outwardly-tapering ends $C^5$ of the die-arms it presses the die inward against the seat, thus holding the die in its central position relatively to the seat.

As illustrated in Figs. 3 and 4, the head H of the holder contains a seat I, similar to the seat B, but connected by a universal joint with the said head H, so as to turn in all directions to adjust the die to the work. The seat I is for this purpose connected at diametrically opposite points by screws J with a ring K, which in turn is connected by screws J' with the head H, the said screws J' being located diametrically opposite each other and at right angles to the other screws J. (See Fig. 4.)

The cap L for the seat I is provided with a threaded flange L', screwing in the seat I, and this flange is beveled at its under side to engage the beveled arms of the die in the same manner as the cap D above described, to allow for any irregularities in the arms of the die.

Now it will be seen that by the arrangement described the die-seat is free to oscillate in any direction, and with the looseness of the spindle $A^5$ in the sleeve G the die or tap held in the seat readily adjusts itself to the work to insure a perfect cutting of the threads, and this adjustment of the die takes place in case the spindle of the machine is out of alinement with the axis of the tap or die holder or in case the sides of the die do not stand at right angles to the axis of the work. Furthermore, irregularities in dies, such as shown in Fig. 5, are rectified by the caps D and L on screwing the latter up in the die-seat to hold the die in place.

It is understood that the arrangement described is also applicable in case the die-holder is held in the spindle of the machine and revolves with the spindle instead of being stationary in the turret-head of the machine, as above described.

Having thus fully described my invention, I claim as new and desire to secure by Letters Patent—

1. The combination of the hollow head, the hollow die-seat having universal movement therein and provided in its bore with an outwardly-flaring surface adapted to engage the inner end of the die, and an annular cap removably secured to the said seat to move in unison therewith relatively to the head and provided at its opening with an inwardly-flaring surface adapted to engage the outer end of the die, substantially as described.

2. The combination of the hollow head, the hollow die-seat having universal movement therein and provided at its inner portion with a flaring surface adapted to be engaged by the inner end of the die, and an annular cap removably secured to the said seat to move in unison therewith relatively to the head and provided at its opening with an inwardly-flaring surface adapted to engage the outer end of the die, substantially as described.

3. The combination of the hollow head, the hollow die-seat having universal movement therein and provided at its inner portion with a flaring surface adapted to be engaged by the inner end of the die, the die-seat having a female screw-thread at its outer end, and an annular cap screwing into the said seat to move in unison therewith relatively to the head and provided at its opening with an inwardly-flaring surface adapted to engage the outer end of the die, substantially as described.

4. The combination of the hollow head provided with an annular groove at its outer end, the hollow die-seat having universal movement in the said head, and adapted to engage the inner end of the die; and the annular cap removably secured to the said seat to move in unison therewith relatively to the head and adapted to engage and surround the outer end of the die, said cap being provided with a marginal flange arranged to engage the groove in the head, substantially as described.

5. The combination of the hollow head, the hollow die-seat having universal movement therein, and provided with a flaring surface at its inner portion, the annular cap removably secured to the said seat to move in unison therewith relatively to the head and provided with an inwardly-flaring surface at its opening, and the die having flaring end surfaces engaging the corresponding surfaces of the seat and the cap respectively, substantially as described.

6. The combination of the hollow head, the hollow die-seat having universal movement therein and provided with a flaring surface at its inner portion, and having an inwardly-extending projection, the annular cap removably secured to the said seat and provided with an inwardly-flaring surface at its opening, and the die having flaring end surfaces engaging the corresponding surfaces of the seat and the cap respectively, and an opening receiving the projection of the die-seat, substantially as described.

JAMES M. CARPENTER.

Witnesses:
ORVILLE CARPENTER,
A. F. ANDERSON.